(12) United States Patent
Gimenez et al.

(10) Patent No.: US 9,321,683 B2
(45) Date of Patent: Apr. 26, 2016

(54) DECARBONATION PROCESS

(75) Inventors: Michel Gimenez, Diemoz (FR);
Mehrdji Hemati, Pins-Justaret (FR)

(73) Assignees: LAFARGE, Paris (FR); INSTITUT NATIONAL POLYTECHNIQUE DE TOULOUSE (INPT), Toulouse (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 25 days.

(21) Appl. No.: 14/116,885

(22) PCT Filed: May 11, 2012

(86) PCT No.: PCT/EP2012/058713
§ 371 (c)(1),
(2), (4) Date: Nov. 11, 2013

(87) PCT Pub. No.: WO2012/152899
PCT Pub. Date: Nov. 15, 2012

(65) Prior Publication Data
US 2014/0072484 A1  Mar. 13, 2014

(30) Foreign Application Priority Data
May 12, 2011 (FR) ...................................... 11 54133

(51) Int. Cl.
| | |
|---|---|
| C01B 31/20 | (2006.01) |
| C04B 7/45 | (2006.01) |
| C01B 13/18 | (2006.01) |
| B01J 8/12 | (2006.01) |
| B01J 8/18 | (2006.01) |
| B01J 8/38 | (2006.01) |
| F27B 7/20 | (2006.01) |
| F27D 17/00 | (2006.01) |
| F28D 13/00 | (2006.01) |
| F28D 19/02 | (2006.01) |
| C04B 7/38 | (2006.01) |
| C04B 7/43 | (2006.01) |
| F28C 3/16 | (2006.01) |

(52) U.S. Cl.
CPC ... *C04B 7/45* (2013.01); *B01J 8/12* (2013.01); *B01J 8/18* (2013.01); *B01J 8/1836* (2013.01); *B01J 8/1872* (2013.01); *B01J 8/388* (2013.01); *C01B 13/18* (2013.01); *C01B 31/20* (2013.01); *C04B 7/38* (2013.01); *C04B 7/434* (2013.01); *F27B 7/2033* (2013.01); *F27D 17/004* (2013.01); *F27D 17/008* (2013.01); *F28C 3/16* (2013.01); *F28D 13/00* (2013.01); *F28D 19/02* (2013.01); *B01J 2208/00274* (2013.01); *B01J 2208/00292* (2013.01); *B01J 2208/00513* (2013.01); *Y02P 40/18* (2015.11)

(58) Field of Classification Search
CPC ............ C01B 31/20; C01B 13/18; C04B 7/45
See application file for complete search history.

(56) References Cited

U.S. PATENT DOCUMENTS

| 1,614,387 | A |   | 1/1927  | Pereda |         |
|-----------|---|---|---------|--------|---------|
| 4,367,095 | A | * | 1/1983  | Namy   | 106/743 |
| 4,828,620 | A | * | 5/1989  | Mallow et al. | 106/738 |
| 2009/0255444 | A1 |   | 10/2009 | Martinez Vera et al. | |

FOREIGN PATENT DOCUMENTS

| EP | 0 605 832 | 7/1994 |
| EP | 2 006 252 | 12/2008 |
| JP | 61-101237 | 5/1986 |
| JP | 2010-083735 | 4/2010 |
| WO | WO 2006/042923 | 4/2006 |
| WO | WO 2010/046345 | 4/2010 |

OTHER PUBLICATIONS

International Search Report as issued for International Application No. PCT/EP2012/058713, dated Sep. 4, 2012.
International Preliminary Report on Patentability as issued for International Application No. PCT/EP2012/058713, dated Nov. 21, 2013.

* cited by examiner

*Primary Examiner* — Stuart Hendrickson
(74) *Attorney, Agent, or Firm* — Pillsbury Wintrhop Shaw Pittman LLP (57) ABSTRACT

A process for decarbonation of particles of raw meal, to be burnt in a clinkering kiln at a cement plant, the process includes: a) decarbonation of particles of raw meal, in a fluidized bed heat exchanger, the particles being suspended in a rising carrier gas including carbon dioxide, the fluidized bed heat exchanger having a solid heat carrier circulating counter-current relative to the carrier gas, to provide an effluent gas including carbon dioxide and decarbonated raw meal; b) separating the effluent gas and the decarbonated raw meal c) separating the effluent gas into a first and second part; cooling the first part of the effluent gas and recycling to provide carrier gas, d) isolating the second part of effluent gas e) recovering and re-heating the heat carrier and recirculating to step (a).

11 Claims, 4 Drawing Sheets

DECARBONATION PROCESS

CROSS-REFERENCE TO RELATED APPLICATIONS

This is the U.S. National Stage of PCT/EP2012/058713, filed May 11, 2012, which in turn claims priority to French Patent Application No. 1154133, filed May 12, 2011, the entire contents of both applications are incorporated herein by reference in their entireties.

The present invention relates to the field of hydraulic binders, and in particular to cement. The present invention relates to a new process making it possible to obtain an effluent gas which is rich in carbon dioxide.

Processes for the production of a standard clinker reveal an emission of carbon dioxide of 820 kg per ton of clinker. This emission is divided in the following manner: 535 kg, i.e. 65.2% by mass, coming from dissociation of carbonates in the raw materials and 285 kg, i.e. 34.8%, by mass, comes from oxidation of carbon in the fuel.

Several techniques are known to reduce emissions of carbon dioxide in cement plants, for example by capturing the carbon dioxide. Capture of carbon dioxide after combustion is a known technique, for example, wherein the gases are treated coming out of the chimneys are treated. Generally, the treatment is carried out using solvents, for example an amine. The advantage of this method is to not induce modifications of the production process of the clinker. However, this method has several disadvantages, including cumbersome, expensive and very energy-consuming equipment.

The technique of capturing carbon dioxide by oxy-combustion is also known. In this method, the air used for combustion is replaced by a gas mix rich in oxygen, making it possible to produce combustion gases concentrated in carbon dioxide. It is then easy to separate the carbon dioxide and the water vapour. However, the problem which this method presents is that it is necessary to adapt the existing process by integrating additional equipment. Moreover, it is necessary to produce a gas mix rich in oxygen, which is technically complicated and expensive.

The calcination technique by direct or indirect heating is also known, in which the fume produced by the clinkering kiln at the cement plant does not come in contact with the products to be calcined. The advantage is that an almost pure flow of carbon dioxide may be obtained. In this case, the heat required may, for example, be provided by a gas heat carrier or heat conduction through a wall. Neither are very efficient and in particular, in the second case the installation is cumbersome.

The applicants have found a decarbonation process which overcomes the aforementioned problems and disadvantages. Accordingly, the present invention provides a process for decarbonation of particles of raw meal, to be burnt in a clinkering kiln at a cement plant, which particles having a particle size distribution such that the retention of the particles on a 200 μm sieve is less than 2% by mass and the retention of the particles on a 90 μm sieve is less than 20% by mass, said process comprising the steps of:

a) decarbonation of particles of raw meal, in a fluidised bed heat exchanger, said particles being suspended in a rising carrier gas comprising carbon dioxide, the said fluidised bed heat exchanger having a solid heat carrier circulating counter-current relative to the carrier gas, to provide an effluent gas comprising carbon dioxide and decarbonated raw meal;

b) separating said effluent gas and the decarbonated raw meal c) separating the effluent gas into a first and second part; cooling said first part of the effluent gas and recycling to provide carrier gas, d) isolating said second part of effluent gas e) recovering and are heating said heat carrier and recirculating to step (a).

The process according to the present invention comprises the production of a flow of substantially pure carbon dioxide coming mainly from decarbonation of the calcium carbonate by a process based on the principle of using solid-solid-gas fluidised beds flowing counter current. This process may be directly incorporated in cement production plants to produce an effluent gas which is rich in carbon dioxide (for example 90 to 95% by volume), thus meeting imposed criteria, for example, for subsequent transport and geological storage.

The present invention may present one or more of the following advantages.

The effluent gas which leaves the equipment according to the present invention comprises a considerable concentration of carbon dioxide, for example from 90 to 95% by volume.

A system which operates counter current provides good efficiency of the heat exchanges.

Good efficiency of the equipment according to the present invention generally provides reduced encumbrance of said equipment.

The equipment according to the present invention may be easily incorporated in cement plants as they exist at this time.

The flexibility of adjustments of the operating conditions for the equipment according to the present invention may be an advantage.

The steps of the process of the present invention may be carried out continuously and/or simultaneously.

It is to be noted that the carbon dioxide of the carrier gas may also, for example, come from decarbonation of magnesium carbonate ($MgCO_3$), potassium carbonate ($K_2CO_3$) or sodium carbonate ($Na_2CO_3$).

The raw meal is generally a mix of raw materials, comprising, for example limestone and clay, which is intended to be introduced in a clinkering kiln at a cement plant to produce clinker.

The solid heat carrier is generally a solid material in the form of particles which is heated before being introduced in a heat exchanger or reactor, in order to release its heat and heat another element by contact with said element in the heat exchanger. The solid heat carrier may comprise different types of materials. Suitably, the solid heat carrier comprises particles of clinker, alumina for example corundum, or silica for example quartz. Preferably the solid heat carrier comprises particles of clinker.

Suitably, the particles of the solid heat carrier have an average size of 300 to 600 μm.

Suitably, the particles of the solid heat carrier have a density of 2000 to 4500 kg/m³. Suitably, the particles have a thermal capacity of 800 to 1,500 J/(kg° C.), preferably 900 to 1,300 J/(kg° C.), especially from 900 to 1,100 J/(kg° C.) measured at 900° C.

When the solid particles are heated to a temperature below their melting point but above their sintering temperature, they may adhere to each other if they are in contact. It is to be understood that the particles of the solid heat carrier used in the process according to the present invention do not substantially adhere to each other at the temperatures used in the process. The highest temperature to which the solid heat carrier is submitted in the process according to the present invention is the re-heating temperature in step e). The solid heat carrier is generally re-heated to a temperature less than or equal to approximately 1200° C., preferably to a temperature of 980 to 1150° C., for example, approximately 1100° C. during the re-heating of step e).

The carrier gas is generally a gas which circulates in a heat exchanger or a reactor at a speed such that it can fluidize the particles of a particulate material, which is to say, put in suspension or entrain the particles of a particulate material to be heated or to be chemically converted.

A counter-current fluidized bed heat exchanger/reactor is generally an apparatus which makes it possible to exchange heat between two solid phases, one rising (raw meal) and the other circulating counter-current relative to the raw meal (solid heat carrier). A carrier gas, comprising carbon dioxide and rising, carries the phases and puts them in suspension. According to the present invention, the calcium carbonate in the raw meal may be subjected to a substantially complete conversion into CaO and $CO_2$ in this exchanger/reactor.

Preferably, in the process according to the present invention, the first part of the effluent gas in step c) comprises approximately 10% by volume of the total effluent gas in step b), and the second part of the effluent gas in steps c) and d) comprises approximately 90% by volume of the total effluent gas in step a).

Preferably, in the process according to the present invention, the average temperature of the heat exchanger is from 980 to 1,150° C.

Preferably, in the process according to the present invention, the residence time of the particles of the raw meal in the heat exchanger for the decarbonation step a) is less than approximately 3.5 seconds, preferably less than approximately 3 seconds.

Preferably, in the process according to the present invention, the cooling of the first part of the effluent gas comprising carbon dioxide in step c) is used to pre-heat the raw meal, for example in a cyclone exchange system.

The re-heating of the solid heat carrier in step e) may be carried out in any appropriate reactor known to the person skilled in the art. The preferred reactor is preferably a dense phase fluidized bed reactor or a moving bed reactor.

Preferably, in the process according to the present invention, the particles of the raw meal are heated to a temperature of 600 to 700° C. prior to the decarbonation in step a).

The present invention also relates to a decarbonation equipment, comprising:
a counter-current fluidised bed heat exchanger comprising:
In a lower part of the exchanger:
a means of supplying particles of raw meal to be decarbonated;
a means of evacuating a solid heat carrier, said solid heat carrier preferably comprising particles having an average size of 300 to 600 μm;
a means of supplying a carrier gas comprising carbon dioxide;
In an upper part of the exchanger:
a means of evacuating the decarbonated raw meal particles;
a means of supplying a solid heat carrier;
a means of evacuating a flow of effluent gas comprising carbon dioxide produced during the decarbonation;
a means of heating the solid heat carrier received from the means of evacuating the solid heat carrier and to the means of supplying the solid heat carrier;
a means of cooling the carbon dioxide of the second part of the effluent gas; and
a means of isolating the carbon dioxide.

Preferably, in the equipment according to the present invention, the heat exchanger comprises a section reduction and/or a baffle. It is to be understood, in the present invention and its associated claims, that the term <<one>> means <<one or more>>.

The present invention also relates to a cement plant, comprising the equipment according to the present invention, the decarbonated raw meal being supplied to a clinkering kiln.

DESCRIPTION OF THE PROCESS

Due to the specificity of the production process of clinker, the proposed system to concentrate carbon dioxide according to the present invention is radically different to known processes. It is based on the following finding: out of 820 kg of emitted carbon dioxide per ton of produced clinker, 535 kg come mainly from decarbonation of the calcium carbonate and 285 kg come from the combustion of fuels, for example coal. Decarbonation is a purely thermal phenomenon. It is possible to produce a flow of almost pure carbon dioxide by carrying out the calcining reaction in an enclosure where the calcium carbonate is calcined by indirect heating.

Principle

Figure 1:
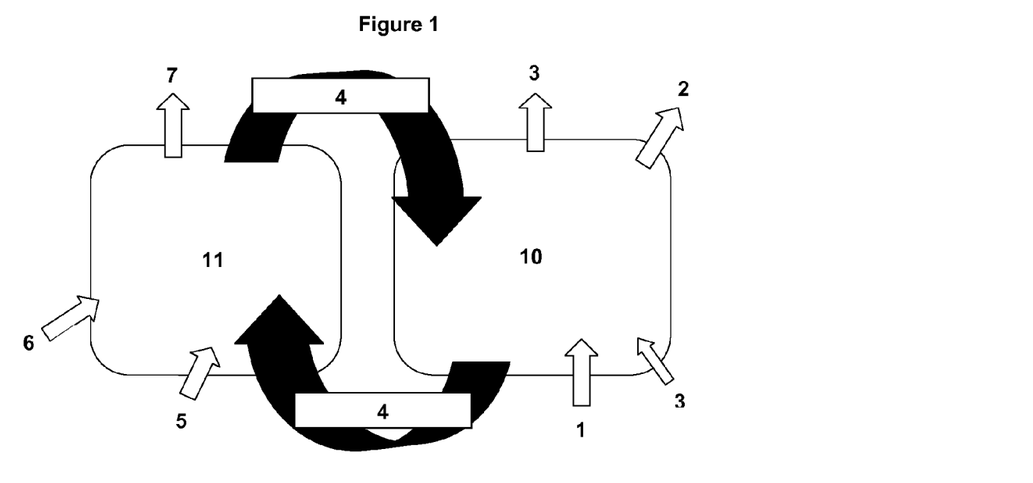
FIG. 1 presents the heating principle by a solid heat carrier 4.
Figure 2:
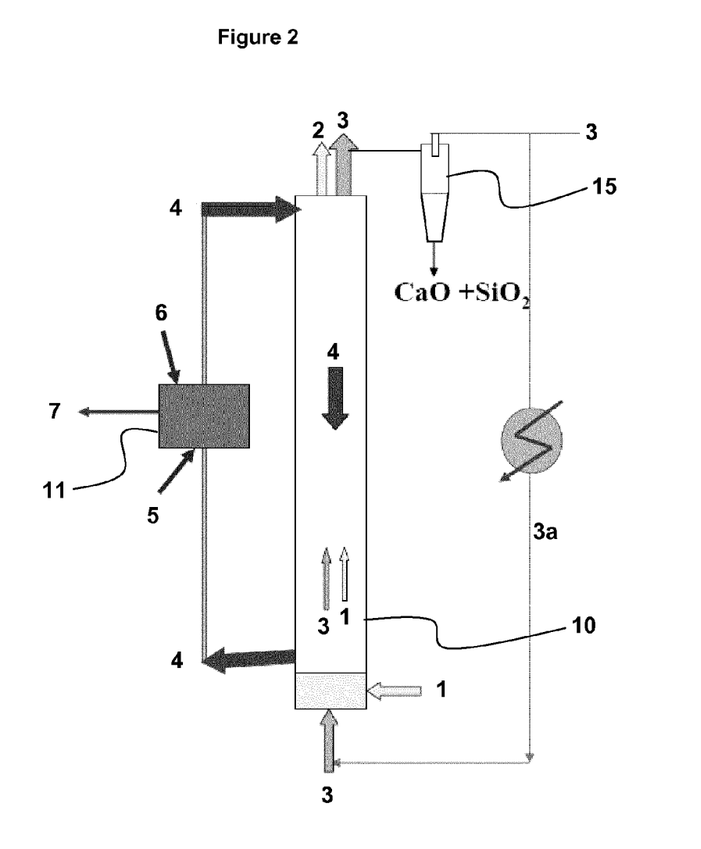
FIG. 2 presents the heating principle by a solid heat carrier 4.

The process and the equipment according to the present invention, shown in FIG. 1 and FIG. 2, is based on the use of fluidized bed exchangers-reactors comprising two inter-reacting sections: the <<combustor>> and the <<calciner>>.

Description of the Calciner

The calciner is the zone where the decarbonation process takes place. Preferably, the heat released in this zone by the solid heat carrier makes it possible to maintain an average temperature of 980 to 1,150° C., and to compensate the endothermicity of the raw meal's decarbonation reaction. This zone is shown in a diagram form in FIG. 3.

The calciner is fed by two solid currents: the solid heat carrier and the particles of the raw meal. Generally, the temperature of the carbon dioxide leaving the calciner is too high to be directly used. It is, for example, possible to have this carbon dioxide circulate in the pre-heating equipment of the raw meal, which comprises several cyclones (for example cyclone exchangers), making it possible to pre-heat the raw meal to temperatures of 600° C. to 700° C. According to another embodiment, it may be possible to circulate the carbon dioxide in a boiler to generate water vapour and electricity. This step makes it possible to reduce the temperature of the carbon dioxide from 650° C. to 200 to 350° C. At this temperature, it is possible to recycle the carbon dioxide. A fraction of the effluent gas leaving the exchanger, the temperature of which is from 200 to 350° C., is recycled as carrier gas in the heat exchanger whilst the other fraction is directed towards storage.

The calciner comprises two parts. The first part, located at its base, generally comprises a dense phase fluidized bed of particles of the solid heat carrier. Preferably, retention of the solid heat carrier in this part is from 20 to 40%, more preferably from 30 to 40%, the percentage being expressed by volume of particles of the solid heat carrier per volume unit of the given part. The fluidizing process is carried out by a carrier gas comprising carbon dioxide. The raw meal is fed and the solid heat carrier is extracted in this part, where the speed of the gas is relatively low. The raw meal is pre-heated to a temperature of 600° C. to 700° C. It is to be noted that the cross-sectional area of this part was calculated in such a way that the speed of the flow of gas is sufficient to lift the particles of the raw meal (higher than the speed of a free fall) whilst ensuring suitable fluidizing of the particles of the solid heat carrier. The raw meal is preferably fed inside the fluidised bed of particles of the solid heat carrier to improve its dispersion, and contact efficiency between the raw meal and the solid heat carrier. The pre-heating of the raw meal before its introduction in the decarbonation zone may be carried out in this part.

Preferably, this first part has a diameter greater than the diameter of the second part described hereinafter. This greater diameter can create a denser fluidised bed than smaller diameters.

The second part, with a smaller diameter, is fed, in its upper part, by the solid heat carrier leaving the combustor, preferably at a temperature of 980 to 1,150° C. The cross sectional area of this part was calculated in such a way that the speed of the flow of gas is greater than the clogging speed during pneumatic transport of the raw meal, and less than the speed of a free fall of the solid heat carrier. Therefore, in this part, the raw meal and the gas, comprising the carbon dioxide, rise whilst the solid heat carrier flows counter-current relative to the raw meal and the gas.

Furthermore, this part may be provided with additional devices, for example narrowing and widening zones, making it possible to improve the dispersion of the particles of the solid heat carrier in the raw meal, and thus improve the exchanges of heat. This variant is, for example, illustrated in FIG. 4.

Preferably, the calciner has a narrowed cross section in the middle of its length. This makes it possible to increase the speed of circulation of the particles of the raw meal and of the particles of the solid heat carrier taking part in the heat exchange, and create mixing or recirculation movements of the particles. This therefore makes it possible to improve the contact between the particles of the raw meal and the particles of the solid heat carrier.

Preferably, there may be several section reductions along the length of the calciner. This makes it possible to improve even more the contact between the particles of the raw meal and the particles of the solid heat carrier, and thus improve the heat exchanges.

According to a variant, the calciner may comprise a baffle to improve contact between the particles of the raw meal and the particles of the solid heat carrier, and hence improve the heat exchanges. This variant may also make it possible to reduce the height of the calciner.

At the output of the calciner, a separator comprising one or more cyclones may be installed to separate the solid particles (calcined raw meal: $CaO+SiO_2$, etc.) from the effluent gas. The solid particles, thus separated are directed towards the clinkering kiln. The effluent gas comprises the carbon dioxide produced by decarbonation and the carrier gas which comprises carbon dioxide. With the aim of improving thermal efficiency and increasing the flexibility of the operation, it is possible to partially recycle the calcined raw meal.

Figure 3:
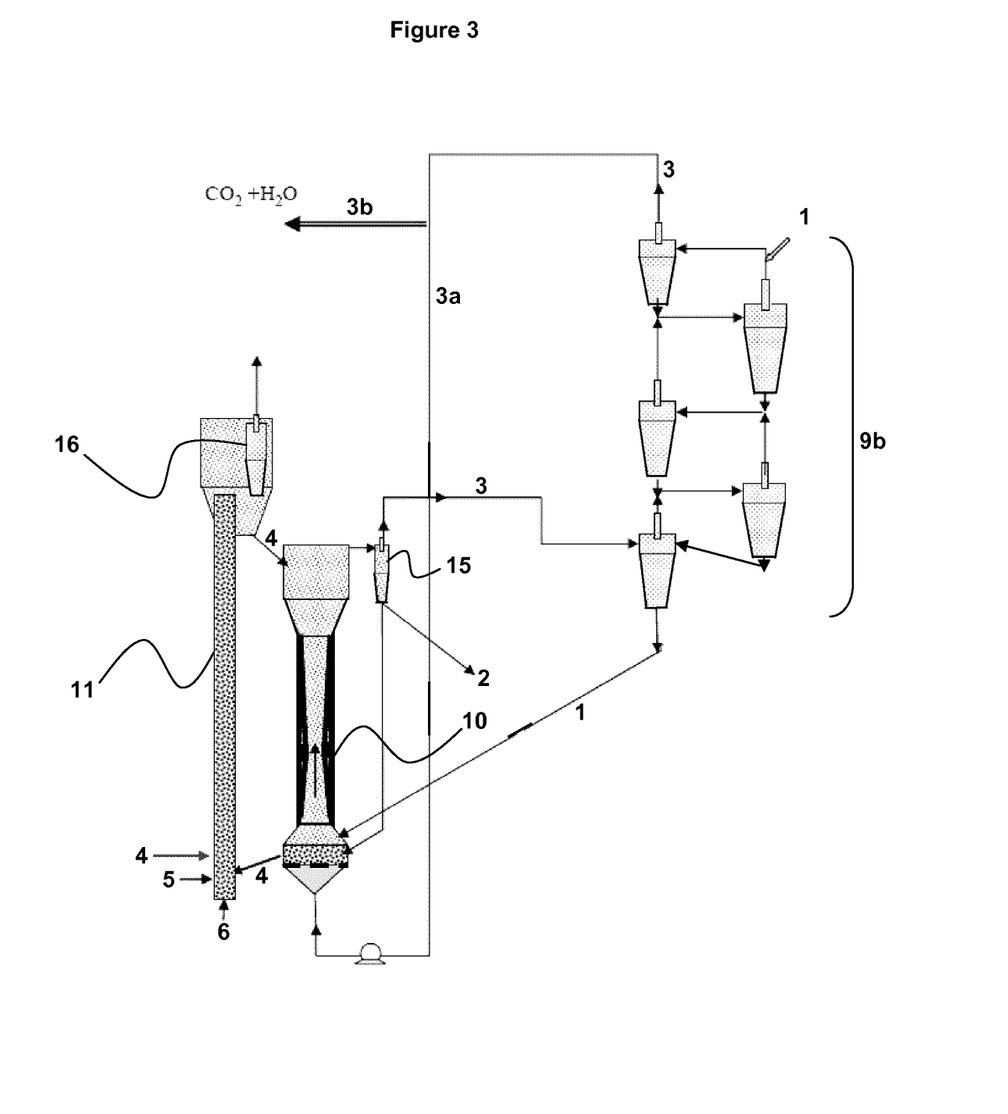
FIG. 3 presents the general diagram of an example of an embodiment of the equipment according to the present invention.

Furthermore, the output of the calciner may be equipped by a widened zone to reduce the number of particles of the solid heat carrier entrained towards the separator, comprising one or more cyclones (FIG. 3).

Preferably, the carrier gas comprises at least 90%, for example from 95% to 100%, by volume of carbon dioxide.

Preferably, the calciner comprises a fluidised bed exchanger/reactor operating at an average temperature of from 980° C. to 1,150° C. It is fed by two solid currents circulating counter current: one current comprises particles of the raw meal rising, and the other current comprises particles of a solid heat carrier, heated in the combustor and circulating counter current relative to the raw meal.

Preferably, a fraction of the gas flow leaving the cyclone exchanger, the speed of which is equivalent to that of the carrier gas, is recycled whilst the other fraction, comprising the carbon dioxide produced by decarbonation, is directed towards a storage zone. Thus, the carrier gas circulates in a closed loop in the process according to the present invention.

The carbon dioxide produced by the process according to the present invention may, for example, be used in a grinder-dryer to reduce the moisture of the raw meal, or it may, according to another example, be used to produce electricity.

Preferably, the effluent gas leaving the calciner comprises mostly carbon dioxide, which is to say at least approximately 90% by volume, i.e. at least 95% by mass of carbon dioxide. The effluent gas leaving the calciner comprises a minority (for example at most approximately 10% by volume) of other gases, which may in particular be air and water vapor.

Preferably, the level of decarbonation, after the particles of the raw meal to be decarbonated have passed in the calciner, is at least approximately 90%.

The calciner used according to the present invention is a fluidised bed heat exchanger. This heat exchanger has a slenderness ratio greater than 1. Preferably, it is in the vertical position, more or less approximately 10 degrees. In the remaining description and associated claims, the adjectives <<upper>> and <<lower>> are used referring to the vertical position.

The calciner is a counter-current fluidised bed heat exchanger comprising:
  in a lower part of the exchanger:
    a means of supplying particles of raw meal to be decarbonated;
    a means of evacuating a solid heat carrier comprising particles, for example clinker, alumina (for example corundum) or silica (for example quartz), preferably having an average size of 300 to 600 μm;
    a means of supplying a carrier gas comprising carbon dioxide;
  in an upper part of the exchanger:
    a means of evacuating decarbonated particles of the raw meal;
    a means of supplying the solid heat carrier;
    a means of evacuating a flow of effluent gas comprising carbon dioxide produced during the decarbonation process.

Preferably, the particles of the solid heat carrier are particles of clinker.

Preferably, the clinker is a clinker with a high content of silica, for example greater than or equal to 23% by mass relative to the total mass of clinker.

Preferably, the clinker is a clinker with a low content of iron, for example less than or equal to 2.5% by mass relative to the total mass of clinker.

Preferably, the clinker is a clinker having both a content of silica greater than or equal to 23% and a content of iron less than or equal to 2.5%, the percentages being expressed by mass relative to the total mass of clinker. This variant can make it possible to increase the sintering temperature of the particles of clinker.

Preferably, the clinker may be a clinker having a $CaO/SiO_2$ ratio less than or equal to 3. The $CaO/SiO_2$ ratio may also be written <<C/S>> using the notations typically used in the cement field.

Preferably, the clinker may be a clinker having a quantity of C3S greater than or equal to 65%.

Preferably, the clinker may be a clinker having both a $CaO/SiO_2$ ratio less than or equal to 3 and a quantity of C3S greater than or equal to 65%.

For example, the cement may have the formula presented below:

| Chemical composition | | | | | | | | | | | |
|---|---|---|---|---|---|---|---|---|---|---|---|
| $SO_3$ | $SiO_2$ | $Al_2O_3$ | $Fe_2O_3$ | CaO | MgO | $K_2O$ | $Na_2O$ | Cl | Total | Free Cao | $Na_2O$ éq. |
| 1.17 | 23.77 | 3.01 | 2.36 | 68.03 | 0.87 | 0.20 | 0.07 | 0.03 | 99.51 | 0.57 | 0.21 |

| Mineralogical composition | | | | | |
|---|---|---|---|---|---|
| C3S | C2S | C3A | C4AF | C/S | A/F |
| 67.78 | 16.62 | 4.00 | 7.18 | 2.86 | 1.28 |

From a thermal point of view, the solid heat carrier enters the calciner at a temperature of 980 to 1,150° C., for example approximately 1,100° C., and leaves it at a temperature of 820 to 950° C., for example approximately 930° C. The carbon dioxide enters the calciner at a temperature of 200 to 350° C., for example approximately 200° C., and leaves it at a temperature of 900 to 980° C., for example approximately 960° C. The raw meal enters the calciner at a temperature of 600 to 700° C., for example approximately 620° C., and the calcined raw meal leaves the separator at a temperature of 860 to 950° C., for example approximately 930° C.

Generally, the temperature of the carbon dioxide leaving the fluidised bed heat exchanger is too high for direct recycling of this carbon dioxide. It is therefore necessary to cool this carbon dioxide. For example, it is possible to circulate this carbon dioxide in the pre-heating equipment which generally comprises several cyclones and which makes it possible to pre-heat the raw meal at temperatures from 600 to 700° C. Preferably, this step makes it possible to reduce the temperature of the carbon dioxide to 200 to 350° C., this temperature being suitable to recycle the carbon dioxide. According to another embodiment, it may be possible to circulate the carbon dioxide in a boiler to generate water vapour and electricity.

There may be floodgates at the base of the fluidised bed heat exchanger to regularly extract the particles of the solid heat carrier which accumulate, in order to recycle them in the heat exchanger.

Description of the Combustor

This device, illustrated in FIG. 3, makes it possible to heat the solid heat carrier leaving the calciner at temperatures from 820 to 950° C. It may be a dense phase fluidised bed reactor or a moving bed reactor, in which the combustion in the air of a fuel (preferably pet coke) provides the necessary energy. At the output of the combustor, the solid phase, which is to say mainly the solid heat carrier, is separated from the fume by a separator comprising one or more cyclones. The solid heat carrier is directed towards the calciner whilst the fume may be used in an energy-retrieval system (exchanger comprising cyclones for example) or in a boiler to generate water vapour and electricity.

With the aim of compensating the loss of solid heat carrier, in particular provoked by attrition phenomena, an additional supply of solid heat carrier is possible.

Preferably, the solid fuel comprises pet coke, a natural gas, waste or mixtures thereof.

According to an embodiment, the combustor used according to the present invention may be operated in an oxy-combustion mode, i.e. by replacing the air used for the combustion by a mix of gases rich in oxygen and substantially free of nitrogen, in order to increase the concentration of carbon dioxide in combustion gas. The quantity of extracted carbon dioxide by the equipment according to the present invention may thus for example be increased by 30%.

The combustor used according to the present invention is a means of heating the solid heat carrier linked to the means of evacuating the solid heat carrier and to the means of supplying the solid heat carrier.

Preferably, the solid heat carrier circulates in a closed loop.

From a thermal point of view, preferably, the solid heat carrier enters the combustor at a temperature of from 820 to 950° C., for example approximately 930° C., and leaves the combustor at a temperature of from 980 to 1,150° C., for example approximately 1,100° C.

Choice of the Calciner's Operating Conditions

The decarbonation reaction of the calcium carbonate into CaO is a reversible and highly endothermic reaction:

$$CaCO_3 \longleftrightarrow CaO+CO_2 \; \Delta H=1655 kJ/kg(900° C.)$$

In terms of thermodynamics, it can only take place above 800° C. and for partial pressure of $CO_2$ in the gas atmosphere less than the equilibrium pressure $P_{eq}$:

$$K_{eq} = P_{eq} = 4.137.10^{12} e^{\left(\frac{-20474}{T}\right)}$$

T being the temperature in Kelvin

Typically, the pre-calciner operates in the following conditions:
average temperature T=900° C.,
average total pressure P=1.013×10⁵ Pa,
average partial pressure of carbon dioxide in the apparatus $P_{CO2}$=30000 Pa.

Therefore, the driving force of the reaction represented by the difference between the pressure of carbon dioxide at equilibrium and the real partial pressure of carbon dioxide in the pre-calciner is equal to 78727 Pa.

During decarbonation by the process according to the present invention, the atmosphere of the calciner comprises substantially pure carbon dioxide; the partial pressure in carbon dioxide is therefore approximately 1.013×10⁵ Pa at sea level. Preferably the average temperature of the calciner should be from 980 to 1,150° C. to maintain the same driving force of the reaction which exists in the known pre-calciner. Therefore, a reasonable increase of the average operating temperature of the decarbonation reactor is required to operate it in a pure carbon dioxide atmosphere.

In terms of kinetics, an increase of the temperature may allow for a notable decrease of the residence time of the particles in the reactor, hence a reduction of the height of the calciner. The temperature of the product leaving the calciner (calcined raw meal) is generally from 860° C. to 950° C.

In terms of the dimensioning of the counter-current fluidised bed heat exchanger, the cross section of the exchanger is generally related to the circulation flow of the desired materials, and the height of the exchanger is generally related to the desired residence time in the exchanger of the particles to be heated.

Figure 5:
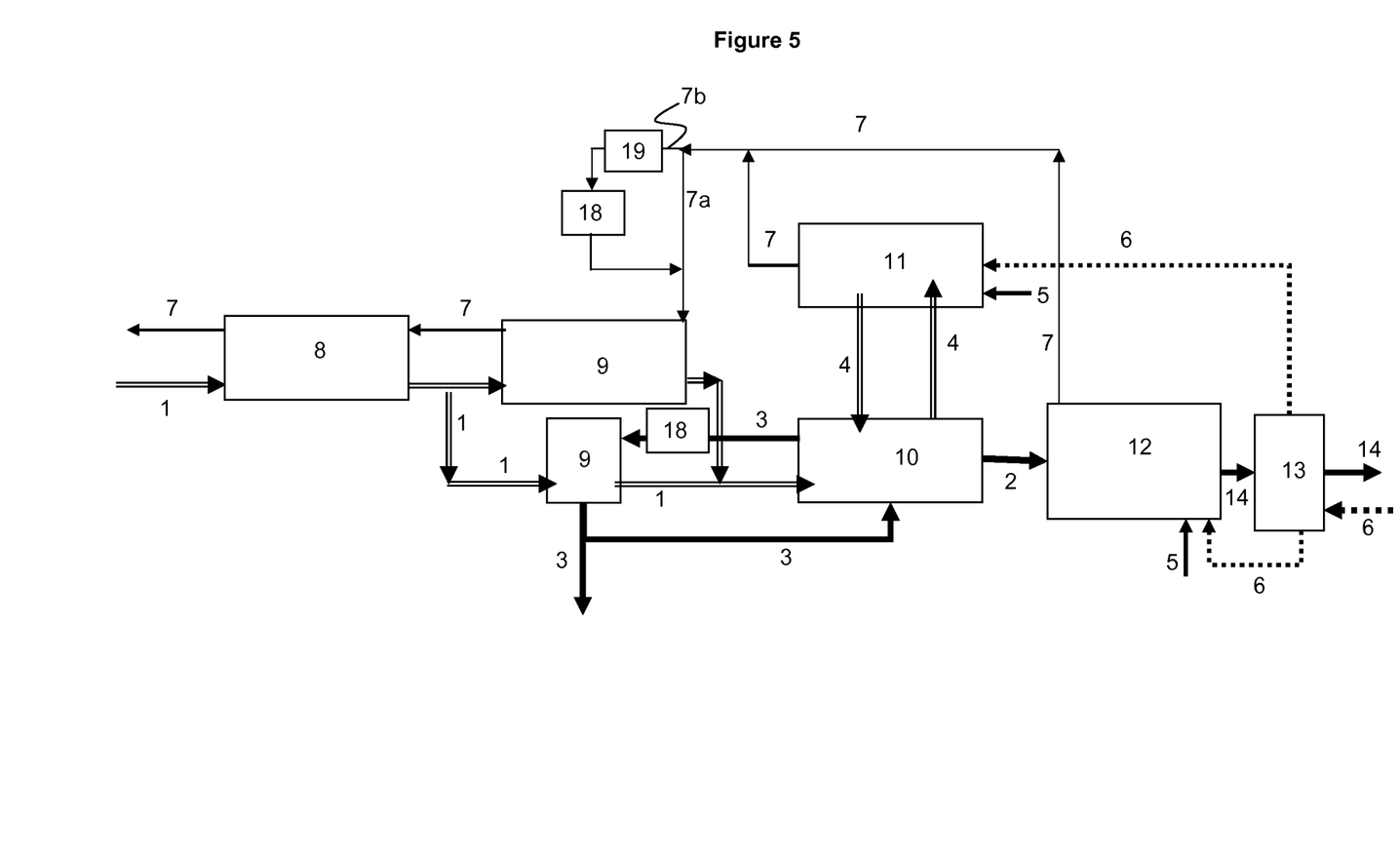
FIG. 5 presents a general diagram of an example of integration of the equipment according to the present invention at a cement plant.

Incorporation of the Equipment According to the Present Invention at a Cement Plant FIG. 5 represents an example of incorporation of the equipment according to the present invention at a cement plant. This integration does not entail a fundamental modification of the production chain.

In the present description and the accompanying claims:

The average size of the particles of the solid heat carrier can be measured using the sieving method. The principle of this method is to classify the particles on a series of sieves encased one in another. The dimensions of the sieve meshes decrease from top to bottom. The particles are placed on the highest sieve and, by vibrations, the particles are blocked on the different sieves according to their size.

The temperature at which a solid particulate material begins to sinter depends, among other, on the melting point of the material and on the size of its particles. The melting point may be measured by calorimetry. The sintering temperature is generally from 0.6 to 0.8 times the melting point in Kelvin degrees. The sintering temperature of impure materials is generally proportionally lower than pure materials. In all cases, in terms of the present invention, the capacity of a solid heat carrier to operate without substantial sintering (and hence without substantial agglomeration) may be determined by routine tests by a person skilled in the art.

The thermal analysis method (using heating and cooling curves) may be used to measure the melting temperature of high temperature materials. The method depends on the absorption or the release of heat which occurs during the melting or solidification of the material. A thermocouple is placed in a crucible (for example of tungsten) and a sample of the material is heated or cooled until its state changes. The temperature of the material remains substantially constant during the fusion or solidification, and the curve of the temperature relative to time remains substantially flat and parallel to the time axis at the melting or solidification point. The thermocouple may be calibrated before determination of the melting temperature using materials having a known melting temperature.

The density may be determined by measuring the volume of a sample of known mass by displacing a fluid (for example water).

The thermal capacity of the particles of the solid heat carrier may be measured by calorimetry.

According to FIG. 1, in the first zone 11, there is combustion in the air 6 with a fuel 5. Fume 7 is evacuated from the first zone 11. A solid heat carrier 4, for example particles of ground clinker is heated. The solid heat carrier 4 is introduced into a decarbonation zone 10 where it comes into contact with the raw meal 1. There is then a release of carbon dioxide 3. Part of the carbon dioxide 3 is recycled to be used as carrier gas in a fluidised bed exchanger-reactor. The solid heat carrier 4 is recycled, then re-heated. The calcined raw meal 2 is evacuated from the decarbonation zone 10. The temperature, the duration of the treatment and the circulation flow of the different materials and the different gases have to be adapted to each specific installation.

The principle of the process and the equipment according to the present invention is illustrated in FIG. 2. The diagram comprises:

a heating zone, called <<combustor>> 11, making it possible to heat a solid heat carrier 4 by combustion in the air 6 of fuels 5 (pet coke, natural gas, waste, etc.). The combustor 11 may be a dense phase fluidised bed exchanger-reactor or a moving bed exchanger-reactor. The particles of the solid heat carrier 4 used according to the present invention may have an average size of 300 to 600 µm. For example, the solid heat carrier 4 may be particles of ground clinker, particles of alumina (for example corundum) or particles of silica (for example quartz). Fume 7 is evacuated from the combustor 11;

a transfer zone of heat from the hot solid heat carrier 4 towards the raw material, the raw meal 1. This zone, called <<calciner>> 10, is the zone where the raw meal 1 is decarbonated. It is a fluidised bed exchanger-reactor operating counter current: the raw meal 1 and the gas 3, comprising the carbon dioxide, rise whilst the solid heat carrier 4 circulates counter current relative to the raw meal 1 and the gas 3. The calcined raw meal 2 is evacuated from the decarbonation zone 10. The carbon dioxide 3 leaving the calciner 10 goes through a gas-solid separation system 15. One part 3a of the carbon dioxide 3 is recycled to be used as carrier gas to operate the calciner 10.

The diagram in FIG. 3 comprises in particular an example of a calciner 10 and an example of a combustor 11. The diagram also comprises a variant according to which the carbon dioxide 3 to be recycled is cooled by passing the carbon dioxide 3 through the pre-heating equipment of the raw meal 1 comprising several cyclones 9b.

According to FIG. 3, the calciner 10 comprises:
The calciner 10,
The circuit of the solid heat carrier 4,
The circuit of the raw meal 1,
The gas-solid separation system (cyclones) 15,
The energy-retrieval system on gas effluents, comprising carbon dioxide 3, by an exchanger comprising cyclones 9b or other types of exchangers,
The circuit of the carbon dioxide 3 and 3a.

According to FIG. 3, at the output of the calciner 10, a separator 15 comprising one or more cyclones is installed. It makes it possible to separate the solid phase comprising the calcined raw meal 2, and the gas phase comprising the carbon dioxide 3. This carbon dioxide 3 passes through the pre-heating equipment of the raw meal 1 comprising several cyclones 9b. One part 3a of the carbon dioxide 3 is recycled in the calciner 10 to provide the carrier gas. The other part 3b of the carbon dioxide 3 is stored or provided for a particular use. On the other hand, the calciner 10 comprises a widened base, which makes it possible to form a denser bed of particles of the solid heat carrier.

According to FIG. 3, the combustor 11 ensures the heating of the solid heat carrier 4 by combustion in the air 6 of a fuel 5 (for example coal). At the output of the combustor 11, the solid phase, which is to say, mainly the solid heat carrier 4, is separated from the fume by a separator 16 comprising at least one cyclone.

Figure 4:
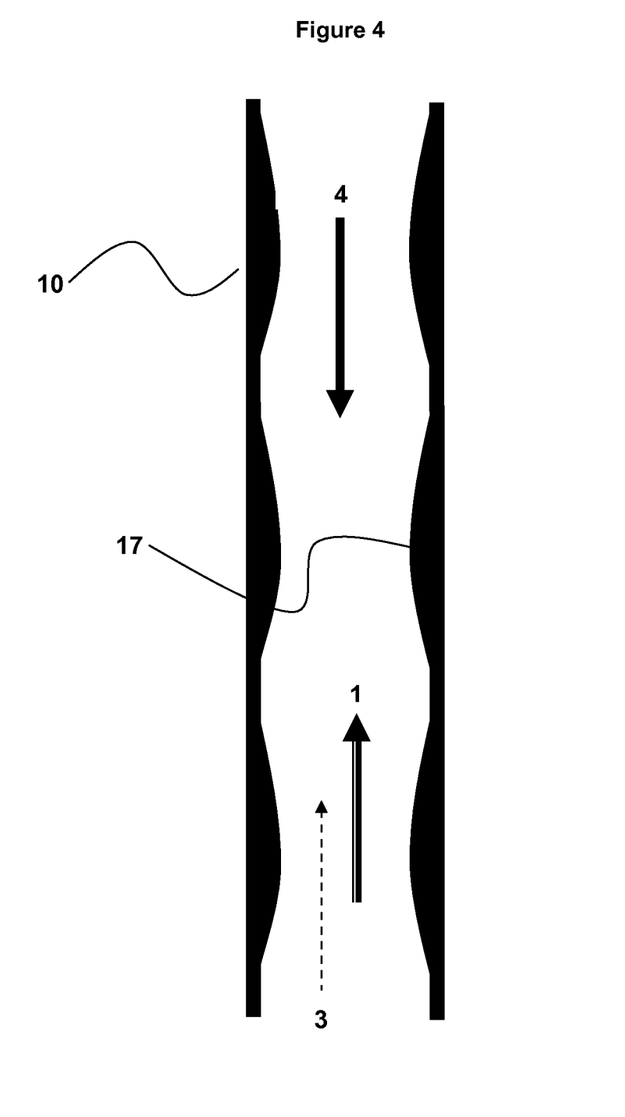
FIG. 4 presents a diagram of an example of the equipment according to the present invention comprising section reductions 17.

The calciner 10 in FIG. 4 comprises reduction sections 17, which make it possible to create turbulences and improve heat exchanges between the raw meal 1, which rises, and the solid heat carrier 4, which circulates counter current relative to the raw meal. The gas 3 rises.

The different reference numbers correspond to the following elements given in FIG. 5: 1: raw meal; 2: calcined raw meal; 3: carbon dioxide; 4: solid heat carrier, 5: fuel; 6: air; 7: fume; 8: grinder; 9: pre-heater of the raw meal; 10: calciner; 11: combustor; 12: clinkering kiln; 13: clinker cooler/air pre-heater; 14: clinker; 18: energy recovery device; 19: pre-heater.

FIG. 5 illustrates that the combustor 11 and the calciner 10 interact together via the solid heat carrier 4, and that they are located between the pre-heating equipment of the raw meal 9 and the clinkering kiln 12. The carbon dioxide 3 produced in the calciner 10 follows a circuit which avoids the clinkering kiln 12 in order to not mix the carbon dioxide 3, to be treated separately, with the fume 7 from the clinkering kiln 12. This makes it possible to avoid a complicated and expensive step to separate the carbon dioxide 3 and other gases comprised in the fume 7 of the clinkering kiln 12.

By following the complete process illustrated in FIG. 5, the raw meal 1 first passes into the grinder 8. It then passes into the pre-heater 9 of the raw meal 1. It then passes into the calciner 10 and leaves it in the form of calcined raw meal 2. This calcined raw meal 2 then passes into a clinkering kiln 12 and leaves it in the form of clinker 14. This clinker 14 then passes into a clinker cooler/air pre-heater 13. The air 6 passes into a clinker cooler/air pre-heater 13 before being re-directed towards the clinkering kiln 12 and the combustor 11. A fuel 5 is used to feed the clinkering kiln 12 and the combustor 11. The fume 7 from the clinkering kiln 12 or the combustor 11 is separated into a first flow 7a and a second flow 7b. The first flow 7a is evacuated passing through the pre-heater of the raw meal 9 and the grinder 8. The second flow 7b passes first into a pre-heater 19 and then into an energy recovery device 18, before being mixed with the first flow 7a before the pre-heater 9. The energy recovery device 18 may for example work using heat exchange. The energy thus recovered may for example be used to produce electricity.

The invention claimed is:

1. A process for decarbonation of particles of raw meal, to be burnt in a clinkering kiln at a cement plant, which particles having a particle size distribution such that the retention of the particles on a 200 μm sieve is less than 2% by mass and the retention of the particles on a 90 μm sieve is less than 20% by mass, said process comprising:
    a) decarbonation of particles of raw meal, in a fluidised bed heat exchanger, said particles being suspended in a rising carrier gas comprising carbon dioxide, said fluidised bed heat exchanger having a solid heat carrier circulating counter-current relative to the carrier gas and the suspended particles of raw material so that the carrier gas and the suspended particles of raw material circulate in a direction opposite to that of the solid heat carrier, to provide an effluent gas comprising carbon dioxide and decarbonated raw meal;
    b) separating said effluent gas and the decarbonated raw meal;
    c) separating the effluent gas into a first and second part; cooling said first part of the effluent gas and recycling to provide carrier gas;
    d) isolating said second part of effluent gas, and
    e) recovering and re heating said heat carrier and recirculating to (a),
    wherein the decarbonation is carried out in a calciner, the process comprising supplying the carrier gas and the particles of raw material at a bottom part of the calciner and supplying the solid heat carrier at an upper part of the calciner so that the solid heat carrier circulates downwardly in the calciner while the carrier gas and the suspended particles of raw material circulate upwardly in the calciner to carry out decarbonation.

2. The process according to claim 1, wherein the solid heat carrier comprises particles having an average diameter of 300 to 600 μm.

3. The process according to claim 1, wherein the solid heat carrier comprises particles of clinker, alumina or silica.

4. The process according to claim 1, wherein the first part of the effluent gas comprises approximately 10% by volume of the total effluent gas, and the second part of the effluent gas comprises approximately 90% by volume of the total effluent gas.

5. The process according to claim 1, wherein the average temperature of the heat exchanger is from 980 to 1150° C.

6. The process according to claim 1, wherein the residence time of the particles of the raw meal in the heat exchanger in (a) is less than approximately 3.5 seconds.

7. The process according to claim 1, wherein the first part of the effluent gas comprising carbon dioxide is used to pre-heat the raw meal.

8. The process according to claim 1, wherein the solid heat carrier in e) is re-heated in a dense phase fluidised bed reactor or a moving bed reactor.

9. The process according to claim 1, wherein the particles of the raw meal are heated prior to decarbonation in (a) to a temperature of 600 to 700° C.

10. The process according to claim 1, wherein the effluent gas comprising carbon dioxide and decarbonated raw meal is outputted at the upper part of the calciner.

11. The process according to claim 1, wherein the carrier gas is outputted at the bottom part of the calciner.

* * * * *